United States Patent
Gebler et al.

(10) Patent No.: US 7,604,216 B2
(45) Date of Patent: Oct. 20, 2009

(54) REMOTELY ACTIVATED MANIFOLD SHUT-OFF

(75) Inventors: Kirk A. Gebler, Chagrin Falls, OH (US); John G. Henderson, Columbus, IN (US)

(73) Assignee: Innovative Technology Concepts, Inc., Chagrin Falls, OH (US)

( * ) Notice: Subject to any disclaimer, the term of this patent is extended or adjusted under 35 U.S.C. 154(b) by 0 days.

(21) Appl. No.: 12/001,018

(22) Filed: Dec. 7, 2007

(65) Prior Publication Data

US 2008/0142749 A1    Jun. 19, 2008

(51) Int. Cl.
F16K 31/04    (2006.01)

(52) U.S. Cl. .................. 251/129.11; 251/288; 251/292; 251/293

(58) Field of Classification Search ......... 251/291–293, 251/286–288, 129.11–129.13, 77–78, 109, 251/90–93; 74/2
See application file for complete search history.

(56) References Cited

U.S. PATENT DOCUMENTS

| | | | | |
|---|---|---|---|---|
| 2,083,532 | A | * | 6/1937 | Kronmiller ................ 251/69 |
| 3,259,357 | A | * | 7/1966 | Sharp ...................... 251/69 |
| 3,382,888 | A | | 5/1968 | Mueller et al. |
| 3,430,916 | A | * | 3/1969 | Raymond, Jr. ............. 251/71 |
| 3,554,218 | A | * | 1/1971 | Smith ..................... 137/385 |
| 3,685,790 | A | * | 8/1972 | Crowe ..................... 251/67 |
| 3,808,895 | A | * | 5/1974 | Fitzwater .................. 74/2 |
| 4,090,589 | A | * | 5/1978 | Fitzwater ................. 251/69 |
| 4,113,063 | A | * | 9/1978 | Troy ....................... 74/2 |
| 4,633,897 | A | * | 1/1987 | Effenberger ............. 251/292 |
| 4,647,003 | A | | 3/1987 | Hilpert et al. |
| 4,705,063 | A | * | 11/1987 | Robinson ............... 251/129.12 |
| 4,771,643 | A | * | 9/1988 | Mott ....................... 74/2 |
| 4,969,482 | A | | 11/1990 | Perrin et al. |
| 5,048,552 | A | * | 9/1991 | Bourne .................... 74/2 |
| 5,131,623 | A | | 7/1992 | Giordani |
| 5,205,534 | A | * | 4/1993 | Giordani ............... 251/129.11 |
| 5,240,030 | A | | 8/1993 | Wang |
| 5,540,414 | A | | 7/1996 | Giordani et al. |

(Continued)

FOREIGN PATENT DOCUMENTS

WO    WO 01/39222 A2    5/2001

*Primary Examiner*—John Bastianelli
(74) *Attorney, Agent, or Firm*—Fay Sharpe LLP

(57) ABSTRACT

A remotely activated shut-off for stopping a fluid flow in a fluid line by actuating an existing valve in fluid connection with the fluid line wherein the valve is within an existing valve body and includes an existing external element for the actuating of the valve between a valve open position and a valve closed position. The shut-off including an outer body having means for connecting the outer body to the valve body in a mounted position such that the external element is substantially covered when the shut-off is in the mounted position. The shut-off further including a coupler for mating engagement with the external element such that movement of the coupler is translated to the external element and a lever within the housing that is moveable between a first position and a second position and is selectively engageable with the coupler such that movement of the lever from the first position to the second position actuates the valve to the valve closed position. The shut-off also including a receiver for receiving a remote signal to move the lever to the second position and turn the valve to the off position.

15 Claims, 7 Drawing Sheets

U.S. PATENT DOCUMENTS

| | | |
|---|---|---|
| 5,634,486 A | 6/1997 | Hatting et al. |
| 5,813,655 A * | 9/1998 | Pinchott et al. ........ 251/129.04 |
| 5,915,668 A * | 6/1999 | Hodapp et al. ......... 251/129.13 |
| 5,918,618 A | 7/1999 | Neupert |
| 6,073,907 A | 6/2000 | Schreiner et al. |
| 6,135,417 A | 10/2000 | Wadsworth et al. |
| 6,170,509 B1 * | 1/2001 | Karta .......................... 251/67 |
| 6,186,471 B1 * | 2/2001 | Genga et al. ........... 251/129.12 |
| 6,206,337 B1 | 3/2001 | Veillet, Jr. |
| 6,880,806 B2 | 4/2005 | Haikawa et al. |
| 7,048,251 B2 | 5/2006 | Schreiner |
| 2002/0134955 A1 * | 9/2002 | Konwinski .................... 251/68 |
| 2003/0052790 A1 | 3/2003 | Dunstan |

* cited by examiner

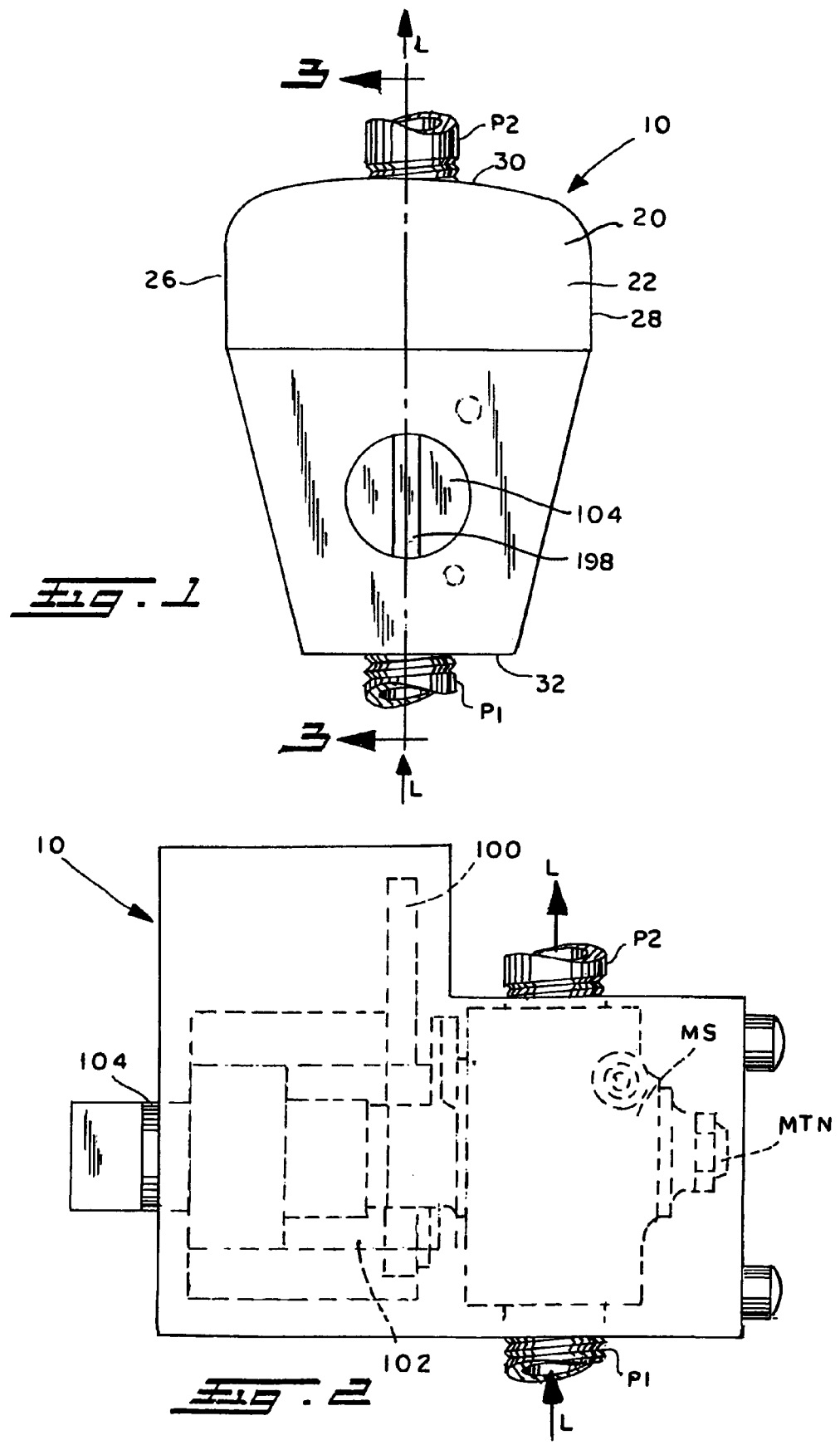

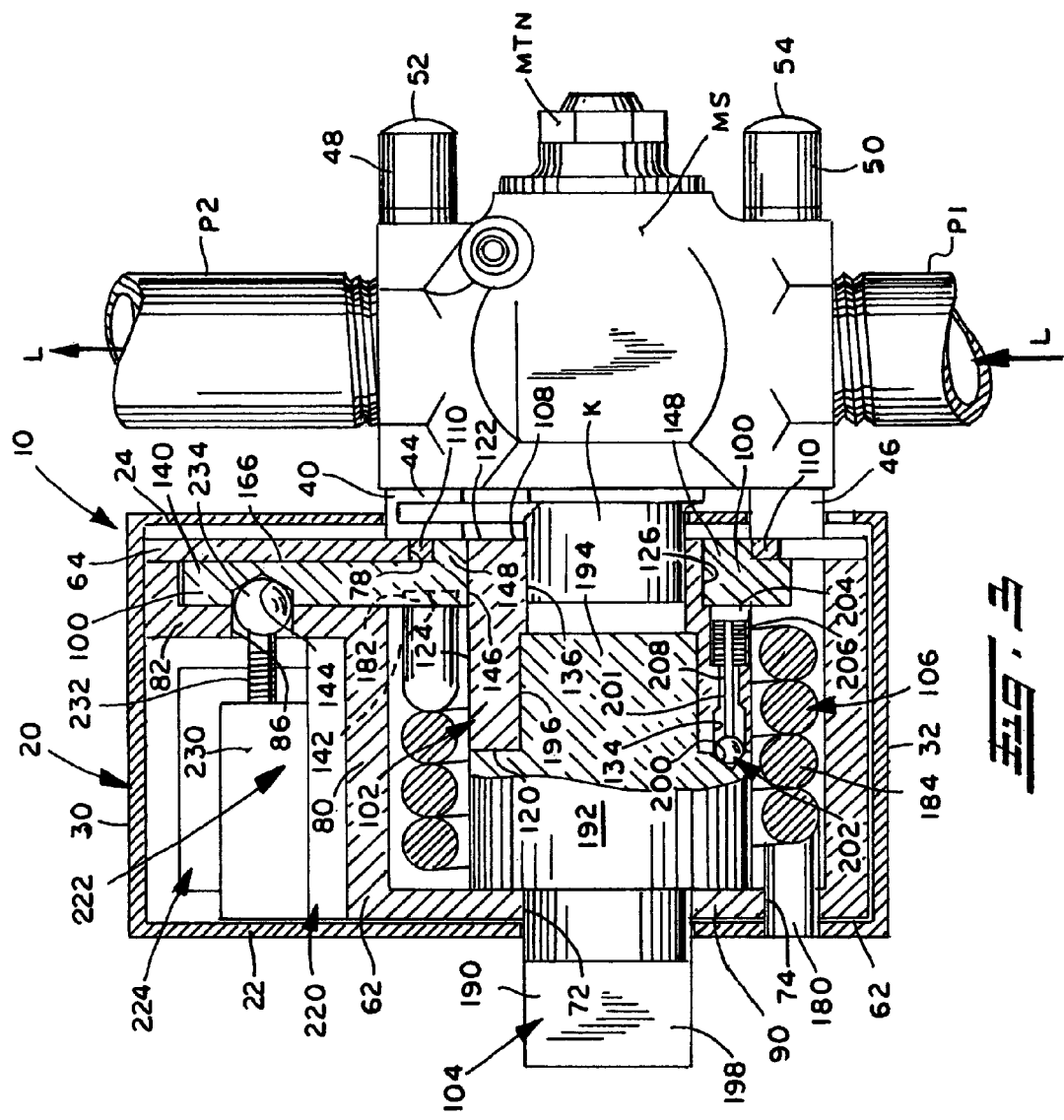
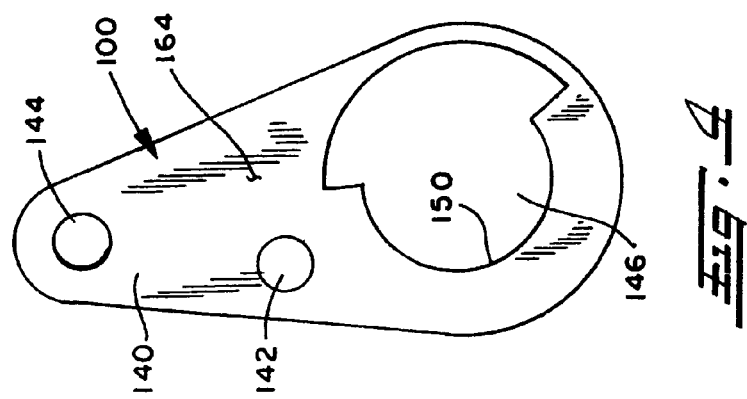

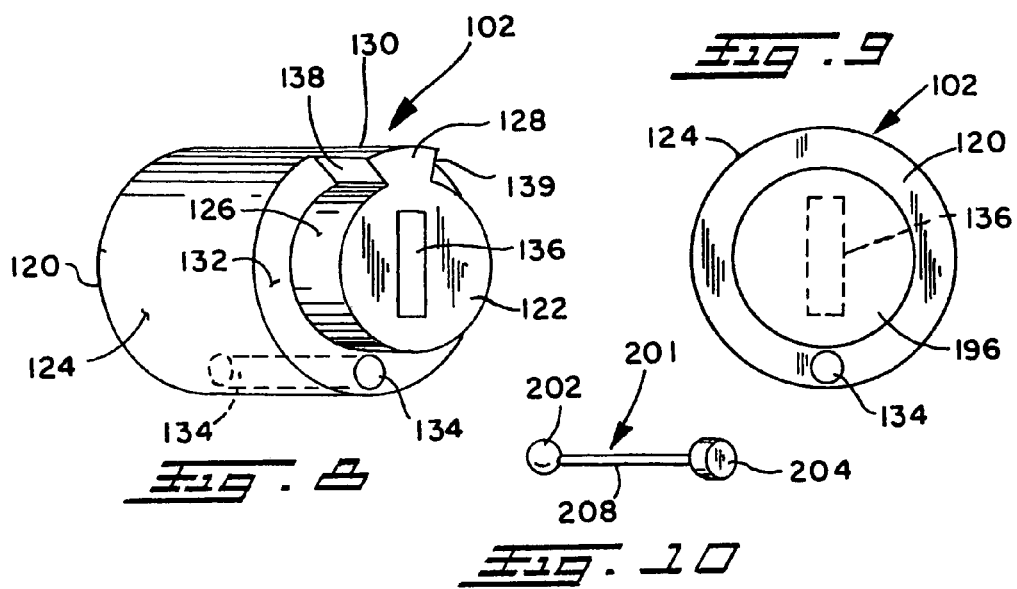
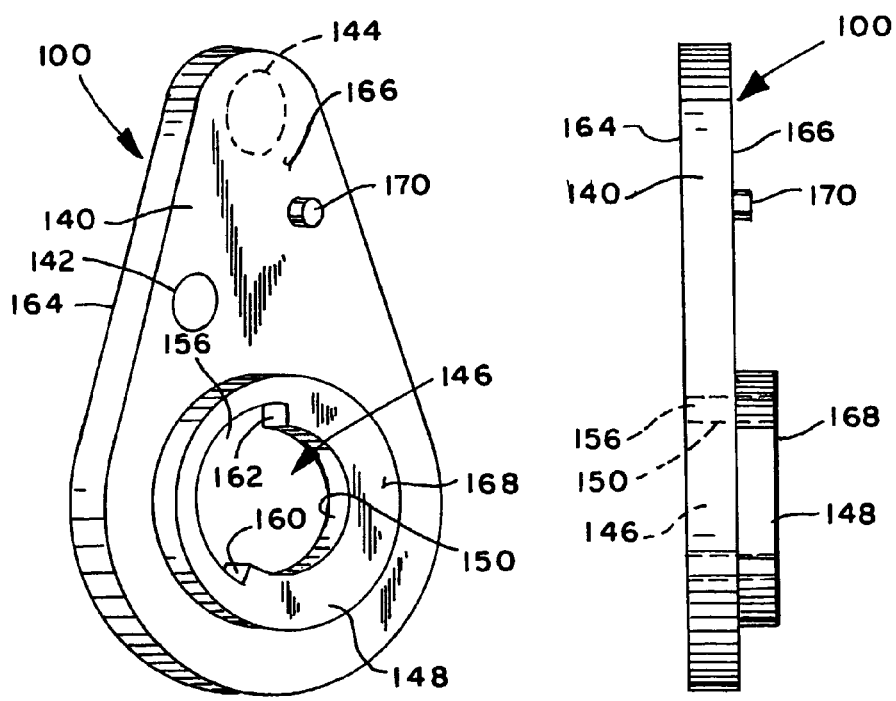
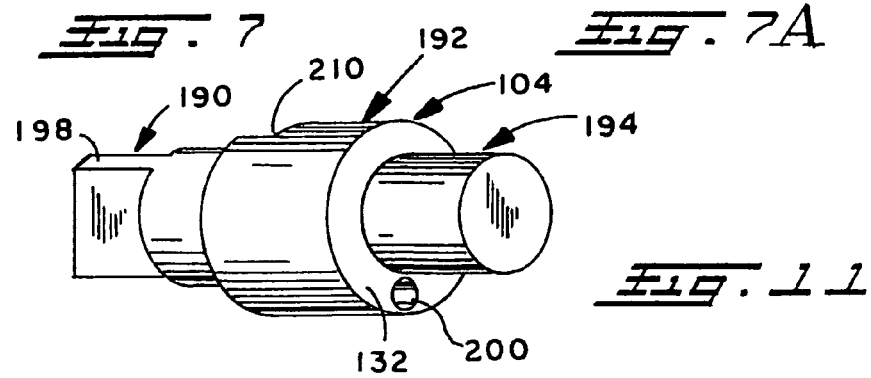

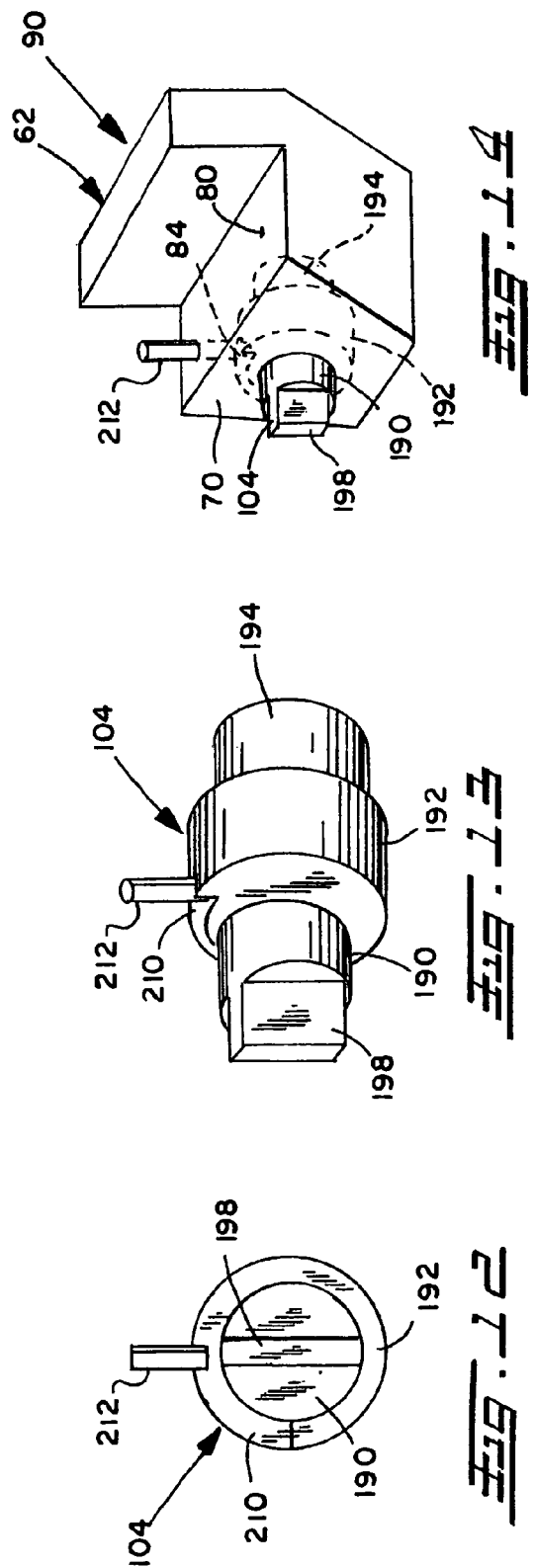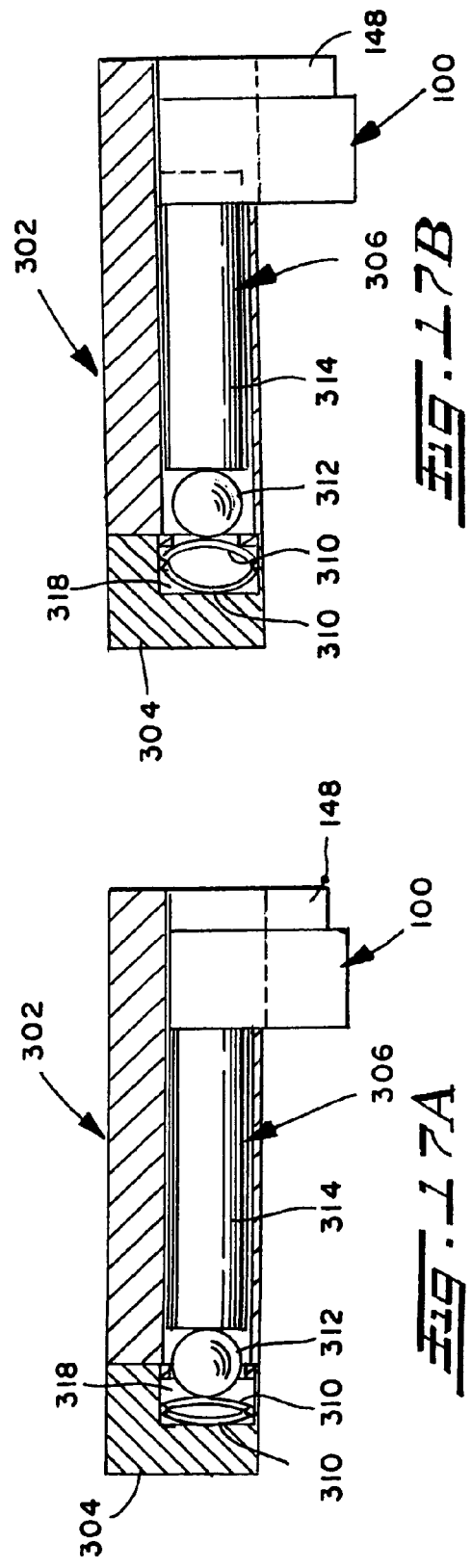

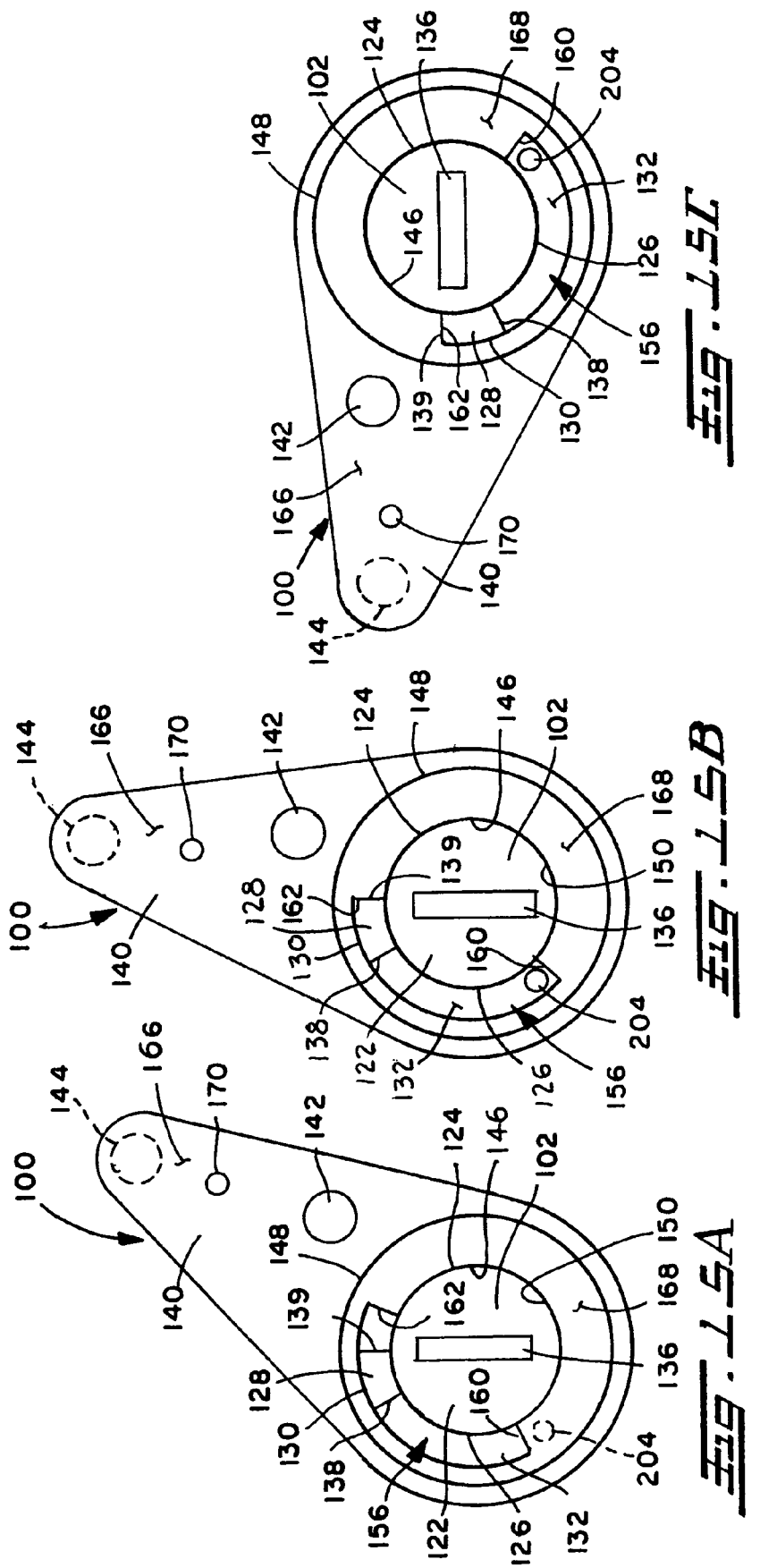

REMOTELY ACTIVATED MANIFOLD SHUT-OFF

CROSS REFERENCE TO RELATED APPLICATIONS

This application claims priority to and the benefit of the filing date of U.S. application Ser. No. 11/334,199 (still pending), filed Jan. 18, 2006, which application claims priority to and the benefit of the filing date of U.S. patent application Ser. No. 10/939,139 (abandoned) filed on Sep. 10, 2004, which application claims priority to and the benefit of the filing date of U.S. Provisional Patent Application Ser. No. 60/502,875 filed Sep. 12, 2003, which applications are incorporated by reference in their entirety.

FIELD OF INVENTION

The invention of this application relates to shut-offs for residential and commercial lines and more particularly to a remotely activated shut-off that can be used in connection with an existing shut-off valve.

INCORPORATION BY REFERENCE

The invention of this application relates to shut-offs for residential and commercial use. Perrin et al. U.S. Pat. No. 4,969,482 discloses an emergency fuel shut-off valve and is hereby incorporated by reference as background material. Neupert U.S. Pat. No. 5,918,618 discloses a gas shut-off system and is also incorporated by reference as background material. United States patent application Dunstan US 2003/0052790 A1 discloses a system and method for communicating flow information for a service line and is incorporated by reference as background material. International publication WO 01/39222 A2 also discloses an emergency shut-off system for service lines and is incorporated by reference as background material.

BACKGROUND OF THE INVENTION

Of course, it is well known that a service, such as natural gas service and water service, provided by a local utility can and does include shut-offs to control the flow of the product to the consumer. Whether the consumer is a residential consumer, a business consumer, an industrial consumer or any other consumer, the local utility must be able to control who is receiving their product. Further, due to natural disasters and other events, the utilities must be able to control the flow of product to prevent unwanted adverse impact to the environment, and/or dangers to the public and/or property. As a result, the service lines include shut-offs to direct flow and to prevent unwanted flow of product. As can be appreciated, multiple shut-offs are needed so that a problem at a particular location does not necessitate a large scale service outage to stop the unwanted flow to the location. As can also be appreciated, increasing the number of shut-offs can adversely increase the amount of labor and the time necessary to stop the unwanted flow of product.

As a result of the above, there is a need for a system that maintains the flexibility of utilizing a large number of shut-offs while minimizing the labor necessary to maintain the high number of shut-offs and the amount of time necessary to reach and manually actuate the shut-offs which can be critical during a natural disaster. Accordingly, it has been found that remotely controlled systems can be used to minimize the labor necessary to maintain a large number of shut-offs by, at least, preventing the utility worker from having to enter a residence or business to stop the flow of product and to monitor the flow of product for billing reasons.

Other systems are available to remotely shut-off a service such as natural gas. Dunstan, Neupert, Perrin, and International publication WO 01/3 9222A2 show gas and other utility systems utilizing shut-off valves. However, these systems all utilize complicated systems which require removal and replacement of existing flow structures including the existing meter stop and even modification of the existing gas line. This requires service to be interrupted and requires a specialist for installation. Furthermore, once the systems are installed, the entire metering system must be thoroughly inspected for gas leaks. The introduction of, and installation can also require additional installation of piping or tubing to make the system function. Installation of these systems can also cause the existing pipe/tubing to be bumped and or dented which will cause damage to the system and system functions. Even after these systems are installed, they utilize complicated mechanical structures. In this respect, one system requires compressed air or pressurized liquid to actuate the shut-off. The pressure holds the system open and loss of pressure is used to turn the system off. As a result, these systems can be costly, they can also be costly to install and maintain. Further, they can present a liability and necessitate installation only by a certified professional.

For the systems which utilize hydraulics or pneumatics, secure installation of hydraulics/pneumatics require that system's tubing be encase in a tamper proof type casing, exacerbating an already time consuming process of installation. Unauthorized individuals could wreak havoc on this type of system with little difficulty.

SUMMARY OF THE INVENTION

In accordance with the present invention, a Remotely Activated Manifold Shut-off Valve (RAMSV) that can be used in connection with an existing shut-off valve is provided which advantageously allows the system to be used with existing meter stops and can be installed without interrupting the product flow through the meter stop. In this respect, provided is a remotely activated shut-off for stopping a fluid flow in a fluid line by remotely actuating an existing valve in fluid connection within the existing fluid line. More particularly, the existing valve is within an existing valve body in fluid connection with the fluid flow in the line and includes an existing external switch or element for the actuating of the valve between a valve open position and a valve closed position. The shut-off or RAMSV has an outer body which can be securely attached directly to the valve body in a mounted position such that the external switch or element is covered by the RAMSV when the RAMSV is in the mounted position. The RAMSV further includes a coupler for mating engages with the external element such that movement of the coupler is translated to the external element wherein movement of the coupler can be used to actuate the element thereby opening or closing the valve. As a result, the RAMSV can be easily installed on an existing valve or meter stop without interrupting the flow of product through the line.

According to another aspect of the present invention, the RAMSV includes a lever within the outer body that is moveable between a first position and a second position that can be remotely activated to move the coupler and turn the valve to the closed position. A receiver can be used to receive a remote signal and initiate the movement of the lever thereby closing the valve and stopping the flow of product through the line. As can be appreciated, by utilizing a remote signal, the valve of one or more shut-offs can be quickly and inexpensively turned to an off position at one time or quickly one after the other. This can be significant cost savings and safety feature.

According to yet another aspect of the present invention, the lever can be selectively engageable with the coupler such that the coupler can be moved relative to the lever to allow the valve to be manually actuated.

According to yet a further aspect of the present invention, the coupler can include a coupler extension that can be used to prevent unauthorized manual actuation of the valve in the event of a remote shut down of the valve. In this respect, and as can be appreciated, if the RAMSV is used to stop service due to a consumers failure to pay a bill, it is advantageous to prevent the consumer from merely restoring service by manually actuating the valve.

BRIEF DESCRIPTION OF THE DRAWINGS

The foregoing will, in part, be obvious and, in part, be pointed out more fully hereinafter in connection with a written description of a preferred embodiment of the present invention, illustrated in the accompanying drawings in which:

FIG. 1 is a front elevational view of a shut-off or RAMSV mounted to an existing meter stop in accordance with the present invention;

FIG. 2 is a side elevational view of the shut-off shown in FIG. 1 having a full enclosure outer body.

FIG. 3 is a sectional view taken along lines 3-3 in FIG. 1;

FIG. 4 is a front view of a lever shown in FIG. 3 in a locked and ready position;

FIG. 7 is a rear perspective view of the lever shown in FIG. 4;

FIG. 7A is a side view of the lever shown in FIG. 4;

FIG. 8 is a rear perspective view of a coupler of the rotational assembly shown in FIG. 5;

FIG. 9 is a front elevational view of the coupler shown in FIG. 8;

FIG. 10 is a rear perspective view of a lock pin shown in FIG. 6;

FIG. 11 is a rear perspective view of a coupler extension of the rotational assembly shown in FIG. 5;

FIG. 12 is a front elevational view of the coupler extension shown in FIG. 11 and a lock pin;

FIG. 13 is a front perspective view of the coupler extension and pin shown in FIG. 12;

FIG. 14 is a front perspective view of the coupler extension and pin shown in FIG. 6 and a housing body;

FIG. 15A is an enlarged rear view of the lever, the coupler and the lock pin shown in FIG. 3 in a locked and ready position;

FIG. 15B is an enlarged rear view of the lever, the coupler and the lock pin shown in FIG. 3 in an intermediate position;

FIG. 15C is an enlarged rear view of the lever, the coupler and the lock pin shown in FIG. 3 in a activated position;

FIG. 17A is an sectional view taken along lines 17-17 in FIG. 16 wherein the lock pin is in the locked condition; and, FIG. 17B is an sectional view taken along lines 17-17 in FIG. 16 wherein the lock pin is in the unlocked condition.

DESCRIPTION OF PREFERRED EMBODIMENTS

Figure 5:
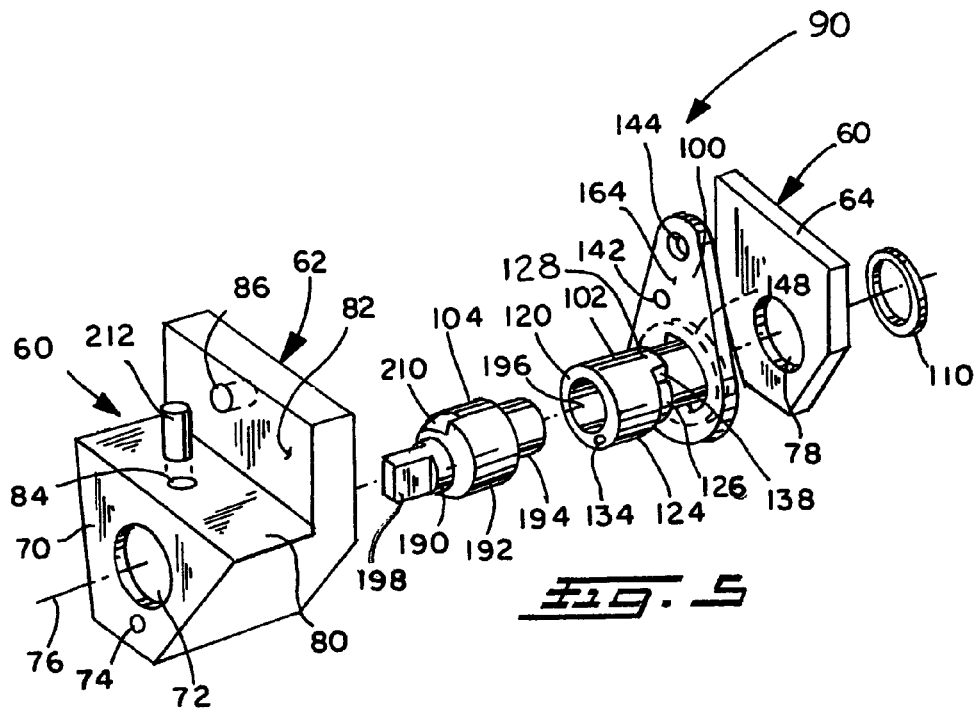
FIG. 5 is an exploded perspective view of a rotational assembly of the shut-off shown in FIG. 1 which includes an inner housing.
Figure 6:
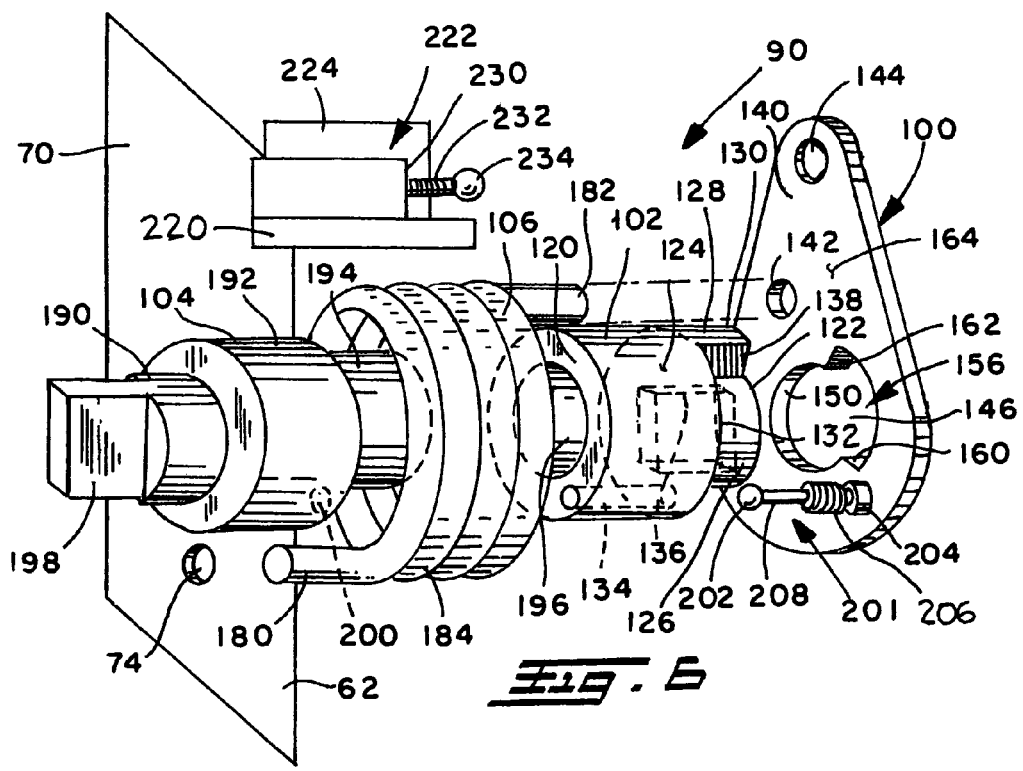
FIG. 6 is an exploded perspective view of the rotational assembly shown in FIG. 5 without an inner housing and which further shows additional control structures.

Referring now in greater detail to the drawings wherein the showings are for the purpose of illustrating preferred embodiments of the invention only, and not for the purpose of limiting the invention, FIGS. 1-15 illustrate a Remotely Activated Manifold Shut-off Valve (RAMSV) or remotely activated shut-off 10 the can be attached to an existing meter stop MS which is in fluid connection in line L wherein natural gas NG enters meter stop MS by way of pipe P1 and exists the meter stop by way of pipe P2. As can be appreciated, like other devices used for utilities, the shut-off can be attached to the meter stop such that unauthorized people cannot remove the device. This can including, but is not limited to, use of any locking fasteners known in the art that prevent removal without a special tool. Further, while the invention of this application is being discussed with respect to its use with natural gas, it has much broader applications wherein it can be used with shut-off valves for other pipeline delivered products.

Shut-off 10 has an outer body 20 that houses the mechanical structure of the shut-off. More particularly, shut-off 10 has a front wall 22, a rear wall 24, side walls 26 and 28, a top wall 30 and a bottom wall 32. In order to access the internal components, one or more of these walls must be removable and/or include an opening. Any outer body design and method of making the outer structural design can be used to make outer body 20. Further, as can be appreciated, the shape of body 20 is, at least, partially dictated by the configuration of the internal components which will be discussed in greater detail below, however, the configuration can be modified based on differences in the embodiments of this application and other factors such as marketing factors wherein a good looking product is typically desired.

Outer body 20 further includes a mounting bracket 40 designed to mount shut-off 10 directly to existing meter stop MS without removing the meter stop from pipes P1 and P2. As can be appreciated, removal of P1 and P2 from meter stop MS would require the flow of product to be turned off. As can be appreciated, the flow stoppage of product is not desired by the end user. Further, the stoppage of flow and reestablishment of the flow line must be done by a professional certified by the utility which can add expense and liability. Mounting bracket 40, in this embodiment, is joined directly to rear wall 24 and is configured to securing mount shut-off 10 to meter stop MS such that the meter stop knob or external member K is substantially covered and cannot be turned independent of shut-off 10 which will also be discussed in greater detail below. While mounting bracket 40 can be configured other ways, known in the art, it includes upper support plate 44 and lower support plate 46 that are shaped to interengage with at least a portion of the meter stop. Bracket 40 further includes back plates 48 and 50 and securing pins 52 and 54 which pass through plates 48 and 50, respectively and threadingly engage with support plates 44 and 46. While not shown, bracket 40 can further, as stated above, include tamper resistant fasteners and/or hardware and further can include tamper indication indicators such as wire tags which are known in the art. These features can be used to reduce the likelihood of the end user and/or unauthorized persons overriding shut-off 10. In addition, as is shown in FIG. 2, and which will be discussed in greater detail below with respect to another embodiment, the body can be configured to fully enclose the meter stop to further prevent tampering. In this respect, the side walls, top wall and bottom wall can be extended and configured to fully enclose the meter stop and to prevent access to the meter stop nut MTN.

Shut-off 10 can further include an inner body 60 shaped to fit within outer body 20 and to further support the inner components of shut-off 10 which will be discussed in greater detail below. As can be appreciated, different inner and outer body structures can be used without detracting from the invention of this application. An inner body structure allows the inner moving components, and others, to be removed, as an assembly, from the outer protective body without the risk of inadvertent disassembly. More particularly, inner body 60 includes a housing 62 and a housing cap 64. Housing 62 includes a front face 70 having through holes 72 and 74 wherein hole 72 is coaxial to a coupler axis 76. Hole 74 is spaced from axis 76. Cap 64 includes a through hole 78 that is also coaxial to axis 76. Inner body 60 further includes walls 80 and 82 that can include through holes 84 and 86, respectively. Cap 64 has a peripheral shape, configured to mate with the rear opening of inner body 60 to be the support and enclose a rotational assembly 90.

Rotational assembly 90 further includes a lever or disconnect cam 100, a coupler 102 and can include a coupler extension 104. Rotational assembly further includes a torsion spring 106. Lever 100, coupler 102, coupler extension 104 and spring 106 are supported by housing 62 and cap 64 for rotation about axis 76. Assembly 90 can further include bearing components such as rear bearing 110 that is designed for reducing the rotational friction in lever 100 and thus assembly 90. As can be appreciated, minimizing the friction in assembly 90 reduces the forces necessary to actuate the system thereby reduce the spring force that needs to be generated by spring 106. Further, while only one bearing is shown, assembly can include additional bearings without detracting from the invention of this application.

Coupler 102 interconnects rotational assembly 90 to knob or member K of the meter stop such that the rotation of coupler 102 is translated to member K. As a result, rotation of coupler 102 can rotate member K between an opened and a closed position which in turn allows the flow of natural gas through meter stop MS or stops the flow of gas through the meter stop, respectively. More particularly, coupler 102 extends between a forward face 120 and a rear face 122. Coupler includes an outer cylindrical surface 124 that is coaxial to coupler axis 76 and extends from forward face 120 toward rear face 122. Coupler further includes a cylindrical surface 126 that is recessed from surface 124 and which having a radially extending tab 128. Tab 128 can include an outer surface 130 that is in line with surface 124 and can extend flush with rear face 122. Further, tab 128 includes stop surfaces 138 and 139 which act to restrict the rotation of coupler 102 relative to lever 100 which will be discussed in greater detail below. The difference in the respective diameters of surfaces 124 and 126 produces a radially extending surface 132. Coupler 102 further locking hole 134 which work in connection with a lock pin to lock coupler extension 104 to coupler 102 such that these components rotate together which will be discussed in greater detail below. Coupler 102 further includes a mating pocket 136 that is shaped to receive knob or member K of meter stop MS. As can be appreciated, the mating engagement between pocket 136 and member K will cause coupler and member K to move in unison. In operation, coupler is rotateable about axis 76, however, as stated above, its rotation is restricted by the interengagement between coupler 102 and lever 100.

Lever 100 includes a lever arm extension 140 having a spring hole or pocket 142 and a lock pocket or hole 144. While lever is shown to be egg shaped, lever 100 can have other outer configuration, including but not limited to a barrel like shape extending about spring 106, however, a portion of the lever, namely, lever arm 140, can extend sufficiently from axis 76 to provide additional necessary mechanical advantage for the remaining components that will be discussed in greater detail below. Lever 100 further includes a through hole 146 with a flange 148. Hole 146 is also coaxial with axis 76 and includes an inner surface 150 that can also extend along flange 148. Through holes is sized to receive a rear portion of coupler 102 such that coupler surface 126 engages lever surface 150 and tab 128 extends into an arcuate restriction and actuation slot 156. As a result, coupler 102 and lever 100 can move relative to one another, however, the relative rotation is restricted. In this respect, slot 156 includes end walls 160 and 162 wherein coupler 102 and lever 100 can rotate relative to one another until stop surface 138 engages end wall 160 or additional stops are reached which will be discussed in greater detail below. As will be discussed in greater detail the relative rotation between coupler 102 and lever 100 is preferably around 100 degrees, however, coupler 102 need only be able to rotate 90 degrees relative to the meter stop to actuate member K between an on position and an off position.

Lever 100 further includes a front surface 164, a rear surface 166 and a rear flange surface 168 which can also act as bearing surfaces for the rotation of the components in assembly 90. Lever can further include a stop 170 extending from one of the components of assembly 90, such as from surface 166 of lever 100, that is engageable with the inner and/or outer bodies to restrict rotation of the assembly. As can be appreciated, the use of a torsion spring can require the use of stops in that the spring often must be rotated further than the desire rotation of the mechanical components to produce the desired spring force acting on the components. As a result, stops can be used to limit the full rotation of lever to a desired value which is preferably approximately 100 degrees. Torsion spring 106 has a front end 180 and extends to a rear end 182 that interengages with spring hole or pocket 142 in lever 100. Front end 180 interengages with at least one of the inner and the outer bodies. Spring 106 further includes windings 184 having an inner diameter greater than the outer diameters of coupler 102 and coupler extension 104.

As is stated above, shut-off 10 can include coupler extension 104 that allows the shut-off to be manually operated either by the consumer and/or an authorized worker working at the consumer's home or business. However, if, for whatever reason, the shut-off is activated such that the natural gas is shut off, it is advantageous that the valve cannot be manual switched back on. Accordingly, coupler extension 104 can be configured to be only selectively interengageable with the coupler. More particularly, extension 104 includes a forward portion 190, a central portion 192 and a rearward portion 194. Forward portion 190 includes a tool receiving implement 198 extending outwardly of outer body 20 to allow manual actuation of the valve, even when the shut-off is mounted on the meter stop. Further, implement 198 can have the same configuration as knob K to allow the same tool to be used for both. Rearward portion 194 is cylindrical and is sized to be rotationally received in a front coupler opening 196 such that extension is free to rotate relative to coupler 102. As can be appreciated, free relative rotation of the extension can be used to prevent the extension from rotating the coupler thereby preventing the extension from being capable of rotating knob K.

In order to allow the extension to be used for selective manual manipulation of the valve, assembly 90 can further include a lock pin 201 and a lock spring 206. In this respect, lock pin 201 can be used to lock coupler extension 104 to coupler 102 when shut-off 10 is in a desired position such as when in a locked and ready condition as is shown in FIG. 15A. Then, the pin can automatically unlock the connection after the shut-off has been remotely activated (FIG. 15B and FIG. 15C). More particularly, extension 104 further includes a pocket 200 in radially extending wall surface 132 between portions 192 and 194. Pin 201 includes a locking implement 202 on one end and a base 204 on the opposite end. Pin 201 further includes a narrow central portion 208 between implement 202 and base 204. In operation, pin 201 extends through hole 134 wherein spring 206 is positioned between base 204 and radial surface 132 of coupler 102. As a result of the spring force of spring 206, pin is urged rearwardly such that base 204 engages surface 164 when shut-off 10 is in the locked and ready condition shown in FIG. 15A. When in this condition, the engagement between base 204 and surface 164 urges pin toward extension 104 such that when the two components are in proper alignment, implement 202 enters pocket 200 thereby locking extension 104 to coupler 102. As a result, the rotation of extension 104 will be translated to coupler 102 and, then, knob K thereby allowing manually manipulation of the valve when shut-off 10 is mounted to meter stop MS. However, when shut-off 10 is triggered, which will be discussed in greater detail below, lever 100 rotates clockwise relative to coupler 102 such that base 204 of pin 201 moves toward slot 156. Then, when lever 100 rotates a sufficient amount, preferable approximately 10 degrees, base 204 reaches slot 156 and the spring force of spring 206 causes pin 201 to move rearwardly wherein implement 202 disengages pocket 200. As a result, extension 104 can move relative to coupler such that manual manipulation of the extension is not translated to the valve.

With particular reference to FIGS. 12-14, in order to prevent unlimited rotation of the valve in meter stop MS, shut-off 10 can further include a rotation limiter. In this respect, extension 104 can further be restricted to a maximum rotation of approximately 90 degrees to allow the extension to only rotate the assembly sufficiently to turn the valve on and off. As can be appreciated, unlimited rotation of assembly 90 and/or the meter stop valve can have adverse effects. More particularly, extension 104 can include a rotation limiting slot 210 in central portion 192 which works in connection with a pin 212 and hole 84 in inner body 62 to limit rotation to preferably around 90 degrees which is the rotation needed to manipulate the valve from an opened position to a closed position. While pin 212 is shown to be a vertically extending pin, the pin can also be a horizontally extending pin extending through the front wall (not shown) of inner body 62 to engage slot 210. In addition, other rotational limiting components known in the art could also be used to restrict the rotation of assembly 90.

The activation of shut-off 10 is controlled by a receiver 220, an actuation controller 222 and a power source 224. In this respect, receiver can be any known receiver capable of receiving a signal including, but not limited to, a radio frequency receiver, a satellite based receiver, a cellular based receiver that is capable of receiving a remote signal, similar technology that is used in automatic garage door opener systems or any other receiver known in the art. Rolling/randomly selected codes that automatically resets the activation code each and every time shut-off 10 is activated can also be used. Further, power source 224 can be any known source of energy capable of actuating actuation controller 222 including, but not limited to, a battery pack or even a solar cell. Actuation controller 222 can include a motor 230 capable of driving a screw drive 232 attached to an implement 234. As can be appreciated, other actuators could also be used without detracting from the invention of this application. More particularly, when in the locked and ready position shown in FIG. 15A, implement 234 is in pocket 144 thereby maintaining lever in the locked and ready position. The engagement between implement 234 and pocket 144 prevents spring 106 from turning lever 100 clockwise (from the front) toward activated position shown in FIG. 15C. Once receiver 220 receives the proper signal to activate shut-off 10 and stop the flow of natural gas, a signal is sent from receiver 220 to controller 222 wherein motor 230, powered by power source 224, turns screw drive 232 such that implement 234 moves forwardly toward motor 230 and implement 234 is removed from pocket 144. The disengagement of implement 234 from pocket 144 allows spring 106 to turn lever 100 clockwise toward the activated position.

With special reference to FIGS. 15A-15C (which are rear views), during the activation of shut-off 10, internal components of assembly 90 move about axis 76 by the spring force produced by spring 106 and do not need energy from the power source which allows the power source to be small in scale and provides for long term use without the need to replace batteries if they are used. Further, it allows the use of alternative power sources, such as solar power, to be effectively used. More particularly, lever 100 is maintained in a locked and ready position or home position (FIG. 15A) by implement 234. Again, once the signal is received by receiver 220 such that implement 234 is removed from pocket 144, lever 100 begins to rotate clockwise when viewing shut-off 10 from the front. During the initial rotation of the lever about axis 76, the lever rotates independently of coupler 102 and extension 104 due to the spacing between end wall 162 in slot 156 and stop 139 towards an intermediate position shown in FIG. 15B. Preferably, lever is allowed to rotate approximately 10 degrees before it reaches this intermediate position and during this initial rotation, base 204 of pin 201 moves along surface 164 or lever 100 until base 204 is allowed to enter slot 156. As stated above, once base 204 enters slot 156, pin 201 disengages extension 104 from coupler 102 thereby allowing extension 104 to move relative to coupler 102. Once wall 162 engages stop 139, the rotation of lever 100 is translated to coupler 102 wherein further rotation of lever 100 causes rotation of coupler 102 by the engagement between wall 162 and stop 139. More particularly, spring 106 causes lever and coupler to rotate an additional approximately 90 degrees which is translated to knob K which closes the valve in meter stop MS (FIG. 15C). Once in this position, manual manipulation of the valve is not possible in that extension 104 is disconnected from coupler 102. Further, coupler is maintained in this position based on the engagement by lever 100 and lever 100 is prevented from rotating further than 90 degrees by the engagement of the lever and/or the coupler with the inner and/or outer body of the shut-off.

Because shut-off 10 is completely self-contained and compact, there is nothing external to be susceptible to malicious manipulations besides the ability to manually turn the valve on and off by way of extension 104. In addition, shut-off can include a tamper activation switch 240 that automatically activates the shut-off if someone attempts to remove the outer body of the shut-off. Further, as is stated above, shut-off 10 can be easily mounted to an existing customer meter stop in such a manner that it covers the existing meter stop as well as the in/outlet pipe ends and does not require the expertise necessary to disconnect and reconnect gas lines.

In another embodiment, not shown, variably sized adapters can be used to allow the construction and installation of a one-size shut-off 10 unit to fit various meter stop styles and sizes. Further, as can be appreciated, multiple sized and configured shut-offs could also be utilized.

In yet another embodiment, not shown, shut-off can be set-up to be only controllable by authorized persons supplied with current lock hardware known in the art and future lock and key hardware. When activated, possibly from a remote location, the lever action described above closes the valve and disconnects the extension. As a result, shut-off 10 does not allow for reactivation without authorized persons, on the premises, physically manipulating and resetting shut-off 10 thereby allowing trained person(s) inspections, so all pipeline systems are safe and secure before a reloaded system is again installed and activated.

Further, the shut off valve insures that easy, nearly instantaneous, stoppage of product flow is possible in the case of catastrophic down stream failure, due to pipeline failure or any act of God or other means, that otherwise would cause the uncontrolled release of product. In the case of earthquake or other multi system failure, the valve in the meter stop may be closed without the need for an authorized person's direct and physical manipulation. Further, no amount of external manipulation can cause shut-off 10 to reopen the meter stop valve without the shut-off being removed or destroyed.

In yet another embodiment (not shown), shut-off 10 can further include a transmitter that can be used to send a signal to a central location on whether the valve is in the opened or the closed position.

In yet another embodiment, shut-off 10 can include a visual confirmation mechanism, not shown, including but not limited to a small set of lights, possibly low power draw (redlight/green light). This allows anyone to see that the system is functional. Should the power storage source be depleted, either a red dot or green dot becomes visible depending on the orientation of the meter stop in relation to shut-off 10 in the open (green dot) or closed (red dot) positions. Further, mechanical indicators can be used (not shown) that are activated by the action of spring 106 as it actuates lever 100. This can be as simple as a viewing window through the outer and inner bodies that allows the position of lever 100 to be viewed from the outside of shut-off 10.

In yet another embodiment of the invention of this application, shut-off 10 can be incorporated into a meter stop as opposed to being mounted to an existing meter stop.

Multiple inlet and outlet side pipe sizes are also accommodated by the same or similar means because shut-off 10 can be installed over the existing meter stops. Inside and outside meter stops can be well served by the addition of shut-off 10. Merely changing the housing configuration of mounting brackets can easily adapt to shut-off 10 for use in connection with virtually any existing gas shut-off without modifying the existing shut-off and without stopping gas service to the customer.

In a further embodiment, the extension can be removed such that the flow of product or natural gas can only be controlled by an authorized representative of the utility. As a result, a customer wishing to secure the uninterrupted flow of product are secure in the knowledge that their system demands are not at the mercy of those wishing to disturb the uninterrupted flow of product. This is based on the housing which effectively encloses the shut-off valve and prevents easy access to the shut-off valve without the necessary transmitter, key or tool. Further, shut-off can include an extension cover plate, or other known devices to prevent access to extension 104 (not shown) to prevent unauthorized manipulation of the valve.

However, if/when the need arises, the system can perform its function quickly and completely, possibly activated by remote even at a remote location. Certainly more quickly and safely than if mechanical manipulation was necessary. Furthermore, more than one shut-off can be activated simultaneously in the event of natural disaster or other condition which necessitate shutting down gas flow to a specific area.

Authorized persons with the necessary key can easily unlock shut-off 10 using fasteners locks etc. know in the art and install another preloaded or pre-tensioned or pre-wound shut-off 10 from their inventory, or reset or rewind the preexisting shut-off 10 at the point and time of use. This reduces the number of units necessarily held in inventory for installation. Likewise the components that may necessarily be replaced, i.e., power source, l.e.d.'s, l.c.d.'s, and/or remote sensing devices, are easily accessible once the external cover of the shut-off is removed, lessening the costs both by availability of the equipment as well as man hours and training required for installation.

In yet another embodiment of the present invention, as is stated above, power for the receiver of the shut-off is designed to be drawn from any known long life batteries or other similar power generators. In addition, power can be produced from the mechanical action/motion caused by the motion of spring 106 during actuation. In the event of a battery drain to a point that communication is not completed, a portion of the energy produced by spring 106 action can be utilized to send confirmation of activation by means other than visual, possibly by r.f, or other means of information transmission (not shown).

In yet even a further embodiment of the present invention, a slam shut valve, known in the art, can also be utilized with shut-off 10 (not shown). More particularly, a slam shut valve helps prevent gas leaks by shutting off the gas flow if a leak is detected. The slam shut valve can consist of a sphere suspended between like tensioned springs all in line and in stream of product flow. The sphere is designed to move in such a manner that in the event of a downstream rapid depressurization, or an upstream product over pressurization, the sphere is able to travel in a controlled manner, along an imaginary line to a point that seats the sphere against an immovable portion of the gas line. As can be appreciated, the shut-off which includes a slam shut valve must be incorporated into the flow line of the natural gas line, however, the slam shut valve can be positioned within the shut-off outer body thereby stopping the flow of product through the shut-off system if a leak is detected while preventing access to the slam shut valve. While the product flow causes the sphere to travel in the downstream direction until it contacts the immobile stop seat, once the pressure of flow of the product is again stabilized, upstream and downstream product pressure against the sides of sphere are equalized, the downstream side spring decompresses and the upstream side spring recompresses each to equal or similar orientation as was prior to activation. The sphere automatically returns to its original orientation. Allowing for reestablishing the free flow of product through the shut-off system. The transmitter described above, could also be used to send a message that the slam shut valve has been activated so that repair personnel could quickly be sent to the scene.

In yet another embodiment of the invention of this application, the shut-off can also include opposing valves to permit "bleeding off" of pressure. This can include valves used on both the up and down stream sides of the slam shut stopper to allow for the sphere or other shaped stopper to be returned to its neutral or reset position, between the equally and oppositely positioned orientation springs or other equally effective means, whereby access to the function reset should, by design, require service persons direct and immediate physical manipulation to restore the ready or reset position, redundantly ensuring pipeline integrity and end use safety, prior to reestablishing product flow.

When the Shut-off is used to terminate product flow in response to failure to pay, or other reason deemed necessary, trained persons can verify that the pipeline system is intact and meets requirements necessary for reestablishing natural gas and/or other product flow.

Figure 16:
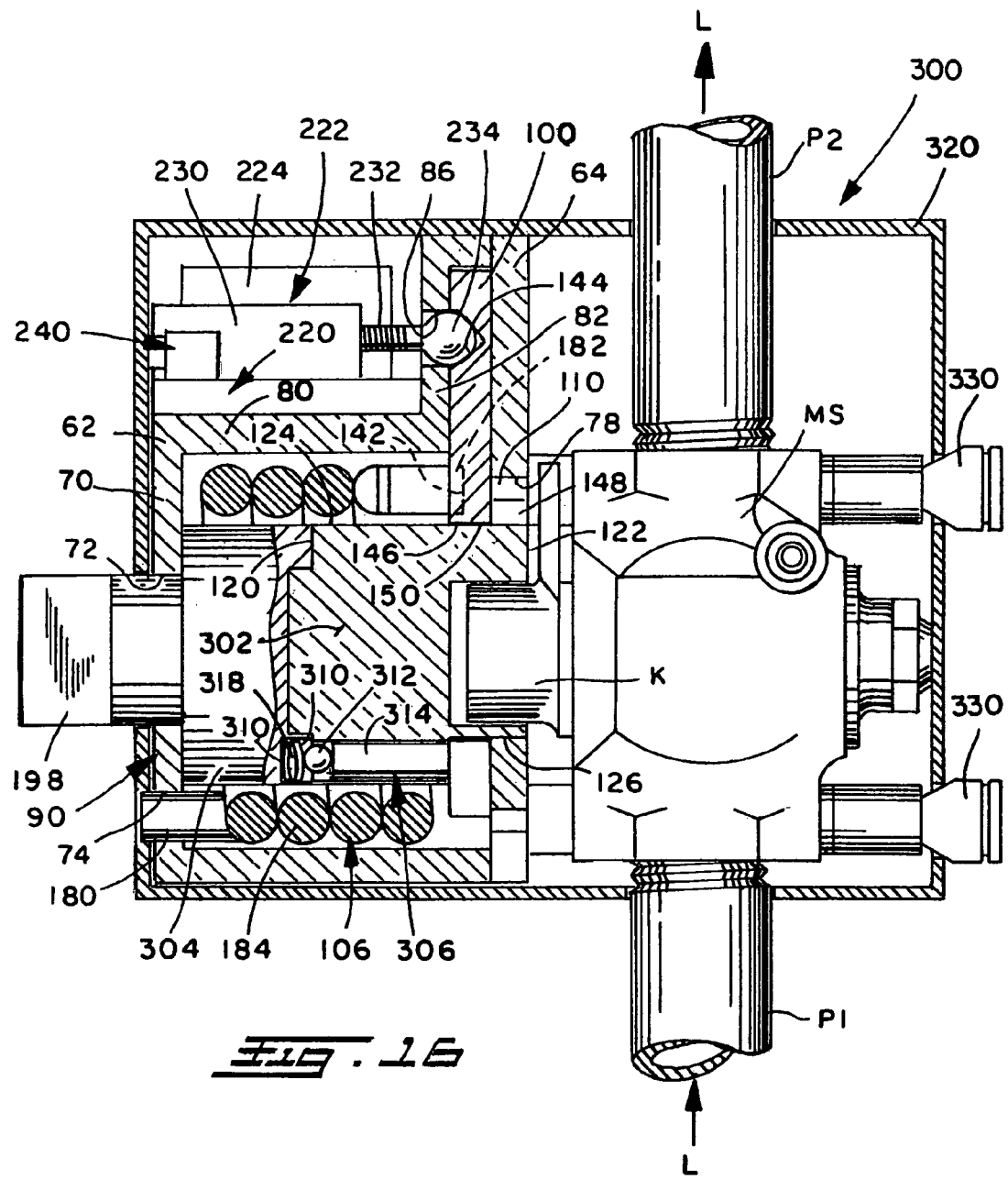
FIG. 16 is a sectional view similar to FIG. 3 showing yet another embodiment of the present invention with an alternative outer body and locking pin.

As with all embodiments and figures, common components will include the same reference numbers in the figures. With special reference to FIGS. 16-17B, while the mechanics of shut-off are shown and described with reference to specific mechanical structures, other equivalent structures could be used without detracting from the invention of this application. For example, pin 201 could be replaced or re-inforced with a disc spring system and still function equivalently. In this respect, shut-off 300 includes a coupler 302 and a coupler extension 304 with a disc spring locking mechanism 306. More particularly, mechanism 306 includes disc springs 310, ball 312 and pin 314. The engagement between pin 314 and lever 100 compresses disc springs 310 to allow ball 312 to partially enter a pocket or hole 318 in extension 304 thereby locking extension 304 to coupler 302 similarly as described above with respect to shut-off 10. Further, shut-off 300 can include an outer body 320 that fully encapsulates the meter stop and includes locking pin connectors 330 to reduce the likelihood of tampering by un-authorized persons including, but not limited to, unauthorized rotation of meter stop nut MSN. Yet even further, any manufacturing technique can be used to create the components of the shut-offs such that, for example, coupler or extension could be produces by two separate components that are press fitted together or joined by other manufacturing techniques.

With all embodiments, the shut-off can be easily re-set by first removing the shut-off from the meter stop, then aligning the coupler with the coupler extension such that the lock enters the pocket. Then, lever 100 can be rotated against the force of spring 106 until implement 234 is in alignment with pocket 144. At that time, screw drive is rotated to lock implement 234 in pocket 144. Finally, the shut-off can be easily re-attached to the meter stop.

As can also be appreciated, the invention of this application can also be applied to other valves located at various different locations in the pipeline system for reasons such as natural disaster. In addition, with respect to the gas customer, shut-off 10 applied and utilized as far upstream from consumption as customers systems permit.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

The invention claimed is:

1. A remotely activated shut-off for stopping a fluid flow in a fluid line by actuating an existing valve in fluid connection with the fluid line, the existing valve being within an existing valve body and including an existing external element for the actuating of the valve between a valve opened position and a valve closed position, said shut-off comprising an outer body configured to mount on the meter stop in the existing fluid line without interruption to the fluid flow in the existing line, said outer body having a tamper resistant mounting bracket configured to secure said shut-off to the existing valve body in a mounted position on the existing line such that the external element is substantially covered by said shut-off when said shut-off is in said mounted position and unauthorized persons are prevented from removing said shut-off from the valve body; a coupler for mating engagement with the external element such that movement of said coupler is translated to the existing external element; a lever within said outer body that is moveable between a first position and a second position, said lever being configured to set said coupler in motion as said lever moves from said first position to said second position such that movement of said lever from said first position to said second position actuates said coupler thereby moving the existing valve to the valve closed position; and a receiver for receiving a remote signal to move said lever to said second position; said shut-off further including a coupler extension having an external portion extending outside of said outer body, said external portion having a tool receiving portion shaped to receive a tool for rotating said coupler extension, said coupler extension is selectively interengagable with said coupler, said coupler extension interengaging with said coupler when said lever is in said first position such that actuation of said coupler extension is translated to the existing external element and said coupler extension being disengaged from said coupler when said lever is in said second position such that said movement of said extension is not translated to said external element.

2. The shut-off of claim 1, wherein the existing valve is a rotary valve and rotates 90 degrees between the opened position and the closed position, said coupler being supported for rotation by said outer body about a coupler axis, said external element being coaxial to said coupler axis when said shut-off is in said mounted position.

3. The shut-off of claim 1, further including a coupler extension having an external portion extending outside of said outer body, said external portion having a tool receiving portion shaped to receive a tool for rotating said coupler extension.

4. The shut-off of claim 3, wherein said coupler extension extends from said coupler.

5. The shut-off of claim 1, wherein said outer body includes an opening and said coupler being positioned near said opening such that said coupler engages said existing external element in said mounted condition, said lever and said coupler being substantially covered by said outer body and the valve body when said outer body is in said mounted condition.

6. A remotely activated shut-off for stopping a fluid flow in a fluid line by actuating an existing valve in fluid connection with the fluid line, the existing valve being within an existing valve body and including an existing external element for the actuating of the valve between a valve opened position and a valve closed position, said shut-off comprising an outer body configured to mount on the meter stop in the existing fluid line without interruption to the fluid flow in the existing line, said outer body having a tamper resistant mounting bracket configured to secure said shut-off to the existing valve body in a mounted position on the existing line such that the external element is substantially covered by said shut-off when said shut-off is in said mounted position and unauthorized persons are prevented from removing said shut-off from the valve body; a coupler for mating engagement with the external element such that movement of said coupler is translated to the existing external element; a lever within said outer body that is moveable between a first position and a second position, said lever being configured to set said coupler in motion as said lever moves from said first position to said second position such that movement of said lever from said first position to said second position actuates said coupler thereby moving the existing valve to the valve closed position; and a receiver for receiving a remote signal to move said lever to said second position; said coupler is generally fixed relative to said lever when said lever is in said second position and said coupler can move relative to said lever when said lever is in said first position.

7. The shut-off of claim 6, wherein the existing valve is a rotary valve and rotates 90 degrees between the opened position and the closed position, said coupler being supported for rotation by said outer body about a coupler axis, said external element being coaxial to said coupler axis when said shut-off is in said mounted position.

8. The shut-off of claim 6, further including a coupler extension having an external portion extending outside of said outer body, said external portion having a tool receiving portion shaped to receive a tool for rotating said coupler extension.

9. The shut-off of claim 8, wherein said coupler extension extends from said coupler.

10. The shut-off of claim 6, wherein said outer body includes an opening and said coupler being positioned near said opening such that said coupler engages said existing external element in said mounted condition, said lever and said coupler being substantially covered by said outer body and the valve body when said outer body is in said mounted condition.

11. A remotely activated shut-off for stopping a fluid flow in a fluid line by actuating an existing valve in fluid connection with the fluid line, the existing valve being within an existing valve body and including an existing external element for the actuating of the valve between a valve opened position and a valve closed position, said shut-off comprising an outer body configured to mount on the meter stop in the existing fluid line without interruption to the fluid flow in the existing line, said outer body having a tamper resistant mounting bracket configured to secure said shut-off to the existing valve body in a mounted position on the existing line such that the external element is substantially covered by said shut-off when said shut-off is in said mounted position and unauthorized persons are prevented from removing said shut-off from the valve body; a coupler for mating engagement with the external element such that movement of said coupler is translated to the existing external element; a lever within said outer body that is moveable between a first position and a second position, said lever being configured to set said coupler in motion as said lever moves from said first position to said second position such that movement of said lever from said first position to said second position actuates said coupler thereby moving the existing valve to the valve closed position; and a receiver for receiving a remote signal to move said lever to said second position; said shut-off further including a coupler extension having an external portion extending outside of said outer body, said external portion having a tool receiving portion shaped to receive a tool for rotating said coupler extension, said coupler and said coupler extension are locked when said lever is in said second position, said coupler and said coupler extension being free to move relative to said lever when said lever is in said first position.

12. The shut-off of claim 11, wherein the existing valve is a rotary valve and rotates 90 degrees between the opened position and the closed position, said coupler being supported for rotation by said outer body about a coupler axis, said external element being coaxial to said coupler axis when said shut-off is in said mounted position.

13. The shut-off of claim 11, further including a coupler extension having an external portion extending outside of said outer body, said external portion having a tool receiving portion shaped to receive a tool for rotating said coupler extension.

14. The shut-off of claim 13, wherein said coupler extension extends from said coupler.

15. The shut-off of claim 11, wherein said outer body includes an opening and said coupler being positioned near said opening such that said coupler engages said existing external element in said mounted condition, said lever and said coupler being substantially covered by said outer body and the valve body when said outer body is in said mounted condition.

\* \* \* \* \*